United States Patent [19]
Lipp

[11] Patent Number: 5,945,150
[45] Date of Patent: Aug. 31, 1999

[54] METHOD FOR PRODUCTION OF CHOCOLATE

[75] Inventor: Eberhard Lipp, Altrip, Germany

[73] Assignee: Lipp Mischtechnik GmbH, Mannheim, Germany

[21] Appl. No.: 09/076,408

[22] Filed: May 12, 1998

[30] Foreign Application Priority Data

May 24, 1997 [DE] Germany .......................... 197 21 791

[51] Int. Cl.⁶ .................................................. A23G 1/00
[52] U.S. Cl. .................... 426/631; 426/519; 426/486; 426/487; 426/478; 99/348; 366/3
[58] Field of Search ............................... 99/348; 426/519, 426/631, 486, 487, 478; 366/3

[56] References Cited

U.S. PATENT DOCUMENTS

| | | | |
|---|---|---|---|
| 3,628,965 | 12/1971 | Nijkerk | 426/475 |
| 3,904,777 | 9/1975 | Martin et al. . | |
| 4,224,354 | 9/1980 | Szegvari | 426/584 |
| 4,440,797 | 4/1984 | Berkes et al. . | |
| 4,628,803 | 12/1986 | Bonora et al. | 99/348 |
| 4,693,904 | 9/1987 | Schmitt | 426/521 |
| 4,713,256 | 12/1987 | Chaveron et al. . | |
| 4,861,615 | 8/1989 | Wiedmann . | |
| 5,152,212 | 10/1992 | Chauveau | 99/348 |
| 5,156,868 | 10/1992 | Muntener | 426/231 |
| 5,215,771 | 6/1993 | Callebaut et al. | 426/231 |
| 5,320,427 | 6/1994 | Callebaut et al. | 366/151.1 |
| 5,351,609 | 10/1994 | Muntener | 99/485 |
| 5,657,687 | 8/1997 | Callebaut et al. | 99/348 |

FOREIGN PATENT DOCUMENTS

| | | |
|---|---|---|
| 2 341 639 | 5/1974 | Germany . |
| 25 10 708 A1 | 9/1976 | Germany . |
| 30 43 327 A1 | 7/1981 | Germany . |
| 35 12 764 A1 | 11/1985 | Germany . |
| 195 03 635 A1 | 11/1995 | Germany . |
| 42 18 011 A1 | 11/1995 | Germany . |
| 195 18 626 C1 | 9/1996 | Germany . |
| 484 691 | 3/1970 | Switzerland . |

OTHER PUBLICATIONS

T. Mühle et al., Die Lebensmittel–Industrie, "Zucker Und Susswaren", vol. 21(11), 1974, pp. 499–504.

Beckett S T., Industrial Chocolate Manufacture and Use, Blackie & Son Ltd. London, GB, pp. 338–342 (1988).

Minifie, B. W. 1989. Chocolate, Cocoa and Confectionery: Science and Technology, 3rd edition. Chapman & Hall, New York, p. 148–162.

Beckett, S. T. 1994. Industrial Chocolate Minufacture and Use, 2nd edition. Blackie Academic & Professional, New York. p. 117–162.

*Primary Examiner*—Carolyn Paden
*Attorney, Agent, or Firm*—Panitch Schwarze Jacobs & Nadel, P.C.

[57] ABSTRACT

A process for manufacturing chocolate includes premixing a charge of cocoa paste, sugar, and optionally powdered milk under application of heat, subsequently conveying the charge to a first grinder, and thereafter treating the resulting paste by tumbling in at least one stirring device under temperature control. In this process, removal of the volatile components as well as the reactions of the charge are conducted in a first operation, the paste is then pulverized, and after that the addition of fat and emulsifiers, and the dispersion and the liquefaction of the paste are implemented in a further operation.

5 Claims, 4 Drawing Sheets

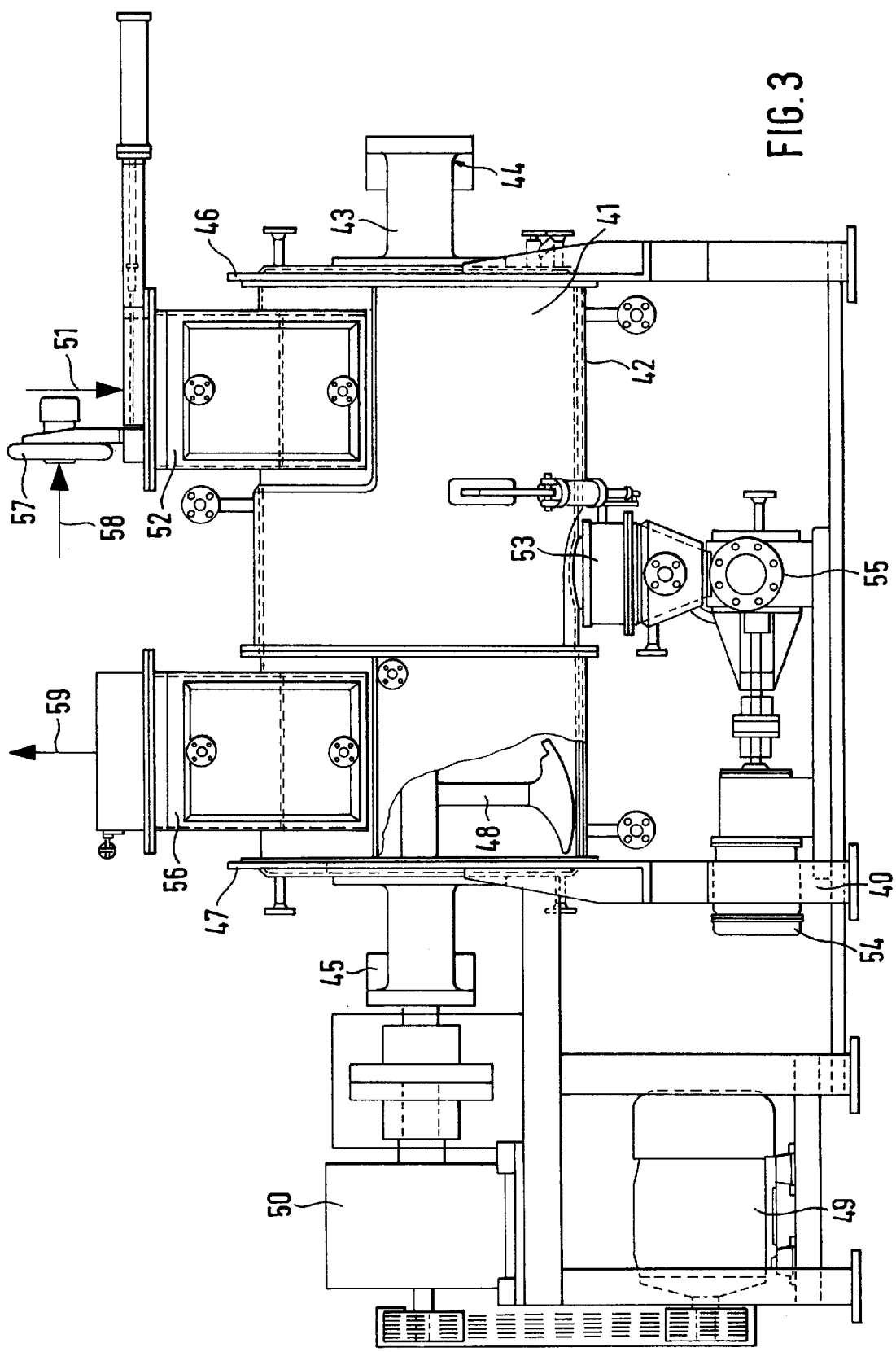

METHOD FOR PRODUCTION OF CHOCOLATE

BACKGROUND OF THE INVENTION

The invention concerns a method for producing chocolate in which a charge of cocoa paste and sugar, and optionally powdered milk, are mixed in a premixer with application of heat. The charge is subsequently fed into a first grinder and there prepulverized. Thereafter, the paste so obtained is subjected to conching treatment in at least one stirring device under temperature control, while substantially removing volatile components in the form of water and organic acids by means of a gas, particularly air, passed through the stirring device. Reactions between the organic components and the reactive carbohydrates of the cocoa paste or milk for the development of taste, addition of fat and emulsifiers, especially in the form of cocoa butter and lecithin, dispersion of fat and emulsifiers and flavorings, as well as the final liquefaction of the paste, are conducted in further steps. Furthermore, the invention concerns an apparatus for implementing this method.

Such a process for manufacturing chocolate is generally known, for which reason this will not be repeated here again in detail. Temperature and other operating conditions are especially known which are a precondition for the process of working the paste in the stirring device, also designated as the conche.

Such a stirring device consists in a known case of a horizontal mixing drum in which is arranged a rotor driven by an electric motor, optionally with a reversible direction of rotation, on which essentially radially directed mixing tools are axially distributed for axial and radial product movement. These mixing tools are so installed that they serve to scrape the paste from the mixing drum wall in one direction of rotation of the rotor, while promoting the unguent-like and paste-like consistency of the paste in the other direction of rotation. Moreover, the jacket on the mixing drum is constructed as a double jacket to which, for example, water can be fed as a heating or cooling liquid, depending on whether in the current stage of the tumbling process in the conche cooling of the paste is indicated for energy elimination or heating of the paste is indicated for maintaining the necessary operating conditions. Finally, the interior of the stirring device is ventilated with the aid of a blower for removal of volatile components accumulating during the operating process, whose presence in the finished chocolate is undesirable.

As is well known, chocolate production transpires between 45 and 120° C., according to the stage of the process and recipe-related additives. Moreover, processing times generally lie in the range of 8 to 24 hours. Finally, processing in a conche especially requires considerable driving energy for the rotor of the stirring device, not only on account of the duration of the working process mentioned, but also in view of the work load which must be applied for mixing the paste and giving it an unguent and paste-like consistency. The known process is therefore lengthy and costly, also in view of the fact that a comparatively robust and complicated apparatus must be used for a certain amount of chocolate over a comparatively long period of time, so that a sufficient dwell time is available for the paste in the individual steps of the working process.

A further disadvantage of the known process consists in that in the conching treatment, removal of the volatile components, development of the taste, and drying are combined with liquefaction of the paste. This demands compromise solutions, since the individual component processes cannot be individually controlled or conducted. On the other hand, it cannot be prevented on this account that the conditions necessary for the individual component processes will mutually disturb each other, which consequently leads to impairments. The only possible way to avoid these again finds its expression in the long duration of the production process.

Thus, for example, attaining the desired taste of the product requires increasing the operating temperature due to the reactions necessary for it, which however can again lead to the volatile components, which are possibly needed for the reaction, being eliminated too soon.

In addition, with the known process, the semi-finished or finished chocolate is present in the conche as a homogenous paste or liquid phase, so that a gas, such as air, can barely come into contact with the chocolate paste for mass transfer, whereby certain reactions and the elimination of volatile components can be hindered.

BRIEF SUMMARY OF THE INVENTION

An object of the invention is therefore to modify the process mentioned at the outset, as well as the apparatus for implementing it, such that a mutually disturbing influence of individual process steps in connection with chocolate production is avoided to the greatest extent, and the duration of the production process, as well as the amount of energy required for implementing it, are thereby substantially reduced. This should be made possible with respect to equipment by means which are comparatively simple and commercially available.

This object is accomplished in accordance with the invention in connection with the process mentioned at the outset, in that the removal of the volatile components as well as the reactions are conducted in a first operation. Then the mass is pulverized, and thereafter the introduction of fat and emulsifiers, and the dispersion and the liquefaction of the paste are carried out in a further step.

In this connection, there basically exists the possibility that the two process steps can be carried out one after the other and thereby separate from each other in the stirring device, whereby the pulverization process can be conducted using rotor-stator mills (known per se) connected with the stirring device. It can, however, be expedient for the first operation to be conducted with the help of at least one separate temperature-controlled mixer, for the subsequent pulverization to take place with a second grinder, and for the further operation to be implemented with the aid of the stirring device.

Correspondingly, underlying the invention is the thought of subdividing the essential part of the process of chocolate manufacture into two separately running process steps which consequently can no longer exert a reciprocally disturbing influence on each other, and which moreover can now be carried out and controlled individually. In this way, as has been shown, a reduction of the overall processing time to at most 2 to 4 hours is possible, hence to at least half of the lowest process duration mentioned at the beginning, which leads to a correspondingly significant reduction in chocolate manufacturing costs.

This also emerges chiefly with respect to required energy use, since a mixer henceforth additionally used manages with a comparatively low drive output as a comparatively simple device, and is in use over the large majority of the overall processing time, while the stirring device which requires a high driving output, is active only during the smaller portion of time in the manufacturing process.

With individual control of the particular operation sequences now possible, process conditions can be achieved which were largely impossible with the known process. This leads to there also being a greater freedom of movement in the selection of raw materials.

Especially owing to the fact that the main fat component of the paste, which is required for the unguent and paste-like consistency of the paste, is now added first at the end of the operation running in the mixer, the cocoa paste, and optionally the powdered milk, can be distributed in a thin layer over a large surface area of the pulverized sugar crystals, which results in an extremely effective exchange of materials, since the thin layer mentioned forms only a very short diffusion path.

A further disadvantage of the known process consists in that by ventilating the stirring device, the excess moisture found in the paste is driven off comparatively rapidly, and reaches the environment with the gas stream serving for ventilation. This leads, for one, to an impairment of the environment due to an unpleasantly smelling gas. Secondly, however, a considerable portion of water is also suddenly missing, which water can favorably influence the reactions for the development of taste, and consequently exert a favorable influence on the taste of the finished chocolate, particularly in connection with the production of milk chocolate.

Henceforth even this disadvantage can be counteracted in a simple manner on the basis of the concept of the presently described invention, in that a refinement of the process of the invention provides that the gas conducted through the mixer is guided in a closed circuit, that in this circuit, during the first operation, the gas is cooled upon exiting the mixer to remove the volatile components by condensation, and subsequently heated before re-entering the mixer and enriched with water to compensate for the water loss, and that at the end of the first operation the water addition is interrupted, and the water content of the paste is reduced to the proportion necessary for finished chocolate.

In this way, there thus exists the possibility of maintaining the water content of the paste during the first operation, or even influencing it in a suitable manner by controls in the direction of the most effective course possible for the reactions taking place in the first operation. The necessary drying then first takes place at the conclusion of the first operation, which can be accomplished within a very short time.

The course of the first operation while maintaining the degree of moisture can, to be sure, lead to minor agglomerations of individual particles of the paste. This does not, however, mean problems of any kind since after carrying out the first operation the paste is conveyed via a second grinder on the way to the stirring device. Possibly present enlarged particles are then also pulverized again by this grinder.

During the first operation, as described above, the paste had no fat component arising from addition, since this would have only been a hindrance for the diffusion processes described. Instead, there exists a certain unavoidable fat component solely through the fat contained in the cocoa paste, and optionally in the powdered milk. Proceeding from this assumption, it can, however, be expedient to add fat to the paste at the end of the first operation. This fat can no longer disturb the first operation. On the other hand, at least a first addition of fat is necessary at the beginning of the second operation for the unguent and paste-like consistency of the paste.

In the conching treatment inside the conche, the unguent and paste-like consistency of the paste first of all requires a high expenditure of energy at the beginning of this operation in order to be able to introduce the required shearing forces. Here a cooling of the stirring device is then also possibly necessary for removing the heat generated by shearing. If creating the unguent and paste-like consistency of the paste has reached a certain degree, the viscosity of the paste diminishes, and the tumbling process in the conche runs over a long period of time up to its liquefaction with further diminishing viscosity of the paste.

Since this coasting of the second operation up to the liquefaction of the paste consumes comparatively a great deal of time on account of the henceforth comparatively low shearing action on the mixing tools, and consequently the stirring device is only partially utilized, it has proven advantageous for the final liquefaction of the paste to be conducted in a third operation, joined at the end of the second operation, by means of a mixer with high shearing action. Here the paste is thus transferred at a certain time in the second operation into a separate mixer which is designed for an extremely high shearing effect, and consequently the liquefaction of the paste can take place within the shortest workable time, so that the conche stands ready at an earlier time for the processing of the next charge of a chocolate paste.

The apparatus suitable for conducting the process described is configured basically corresponding to the indications made in accordance with the invention in comparison with the known apparatus, in that at least one temperature-controlled mixer is connected after the first grinding tool for removal of the volatile components and for carrying out the reactions of the paste, in that a second grinder is connected to the mixer, and in that the stirring device is connected after the second grinder for dispersing as well as for liquefaction of the paste.

In this connection, it is provided in a further development that a closed gas circuit is connected parallel to the mixer, that this circuit has a gas cooler with condensate discharge after its connection for exit of the gas found in the mixer, thereafter a segment for reheating the gas up to a temperature suitable for the process sequence, as well as (before the connection for reentry of the gas into the mixer) a device which can be turned on and off for dosed addition of water for compensation of water loss by the paste, and that in the gas circuit a blower is installed for generating the circulating gas stream.

Furthermore, it can here be provided that the dosing device for the water has a heating unit for vaporizing the water.

As for the second grinder arranged after the mixer, this is appropriately in a five cylinder mill.

Finally, it can be provided that a mixer of high shearing action is connected after the stirring device for final liquefaction of the paste.

To the extent that there was discussion above of a gas for ventilating the mixture, especially in connection with the first operation, this can of course be air in the simplest case. It should nonetheless be added that, whereby the gas is henceforth guided in a closed circuit, there also exists the possibility of using another or differently composed gas, optionally with special admixtures, in order to influence positively or promote the first operation within the mixer.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 3 is a side elevation view of a stirring device or a conche for carrying out the method of the invention;

DETAILED DESCRIPTION OF THE INVENTION

Figure 1:
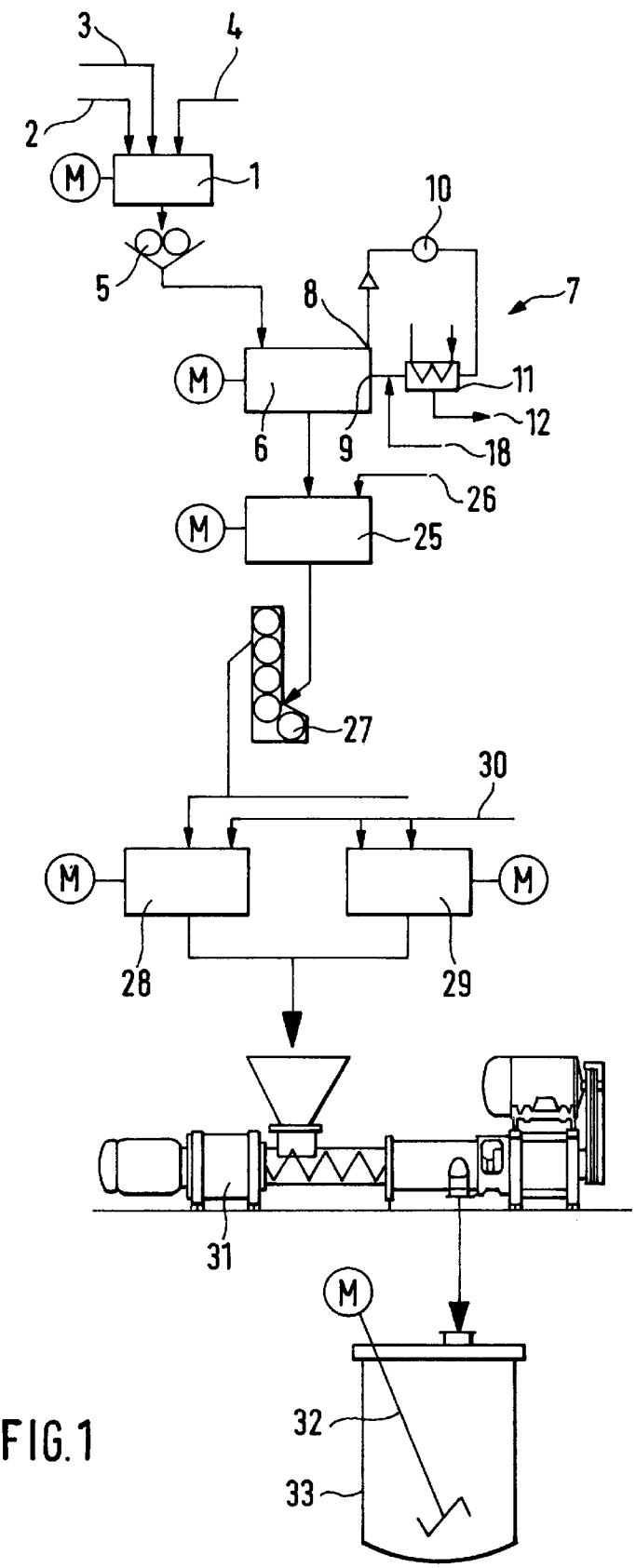
FIG. 1 is a schematic representation of the process of the invention.

In accordance with FIG. 1, a premixer 1 for creation of a charge for chocolate manufacture is filled with cocoa paste 2, sugar 3, and optionally powdered milk 4. Mixers or stirrers are generally designated by the symbol M in FIG. 1. This filling, to which further small amounts of reactive carbohydrates and flavor additives can be added according to recipe, is carefully mixed in the heated premixer at a temperature in the range of 45 to 100° C. Then, the mixture passes through a two roll grinder 5 in order to pulverize the solids contained in the mixture.

From the grinder 5, the charge so formed proceeds to a mixer 6, through whose operation it is assured that the components remain well mixed, and the cocoa paste and optionally the powdered milk are finely distributed over the entire surfaces of sugar particles.

During the mixing process taking place here, the volatile components of the paste are substantially driven off in the form of water and organic acids under applications of heat and are carried away by a gas serving for ventilation.

Figure 2:
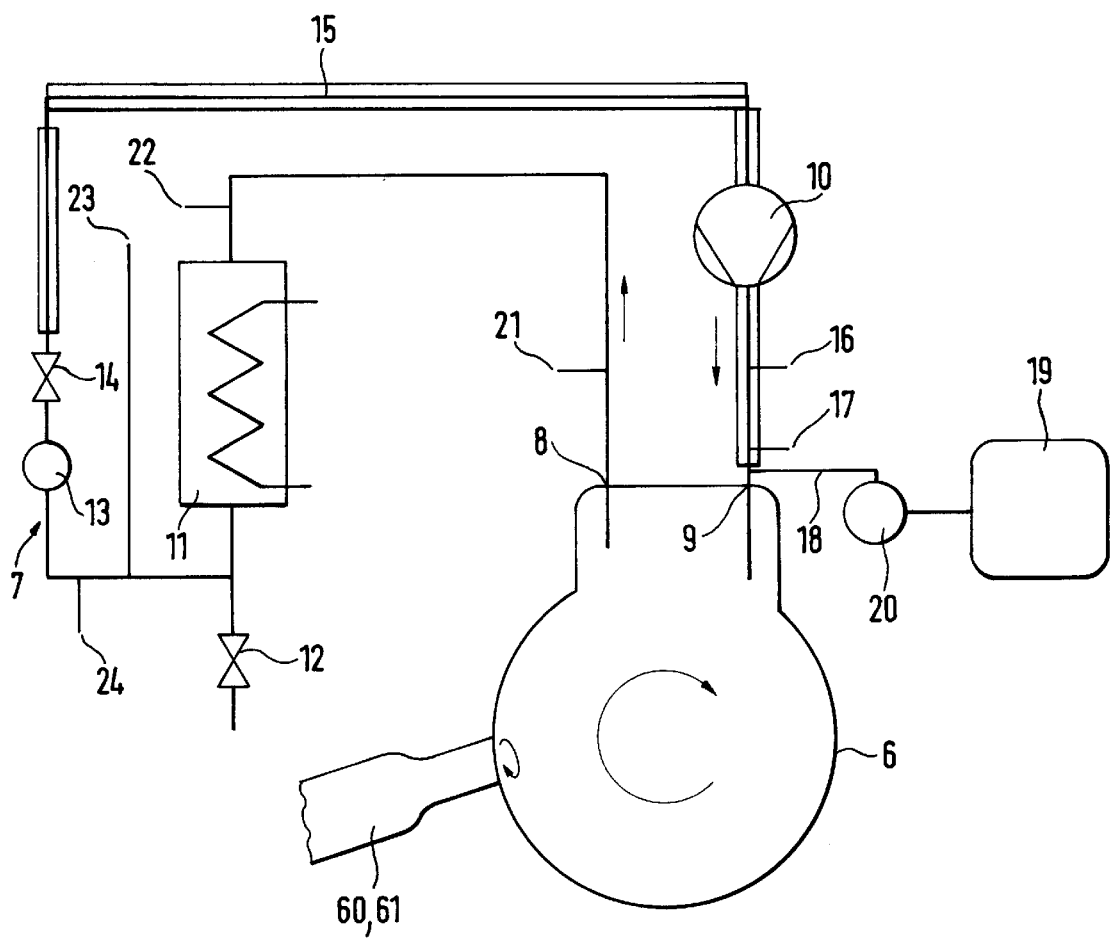
FIG. 2 is a schematic representation of a mixer with closed gas circuit.

This gas runs, as is apparent from FIG. 2, in a closed circuit 7 between an outlet 8 and an inlet 9 on the mixer 6. A blower 10 is located within this circuit 7 for generating gas circulation, as is a gas cooler 11 with condensate discharge 12 in which the gas is cooled down, so that the volatile components of the processed paste taken up by the gas condense and can be removed.

In connection with the gas cooler 11, the gas reaches a heating segment 15 through an anemometer 13 serving as a control and a throttle 14, in which segment the gas is returned to a temperature suitable for the process sequence. At the end of the heating segment 15, there is a sensor 16 for measuring pressure and a sensor 17 for temperature measurement, as well as finally a water inlet 18 for increasing the moisture of the gas to the required amount, which is determined by a regulated fine dosing pump 19. An appropriate heating device 20 is provided in the water supply so that the water can be admixed with the gas in the form of vapor.

In connection with FIG. 2, there are also visible a further sensor 21 for measuring pressure, sensors 22 and 23 for conducting a gas analysis, as well as a sensor 24 for temperature measurement.

The course of the first operation, conducted with the aid of the mixer 6, is described in detail in the introduction to the preceding description, and therefore will not be repeated here. As said there, the first operation concludes with a reduction in moisture, which can occur in a simple way in that the dosing pump 19 is shut off.

Likewise, as already described, fat can be added to the paste at the conclusion of the first operation to prepare for further processing. This can take place through appropriate charging of the mixer 6. With the example of FIG. 1, however, a simple mixing device 25 is provided for this. Paste coming from the mixer 6, and fat 26 are introduced into the mixing device 25, for example in the form of cocoa butter, and mixed for a short time before they reach a further grinder 27 in the form of a five cylinder mill. In the grinder 27, the paste is finely pulverized, in order then to be distributed to two similarly constructed and similarly operating stirring devices or conches 28, 29, where the paste reaches an unguent or paste-like consistency, and is liquefied, optionally with further addition 30 of flavor additives, lecithin and cocoa butter, as this was likewise presented in detail in the introduction to the description.

To shorten the duration of the last part of the liquefaction of the paste, and to free the stirring devices 28, 29 for further charges of chocolate paste, an additional mixer 31 with high shearing action can be connected to their output for final liquefaction of the chocolate paste, from which the chocolate paste is then transferred into a supply container 33 provided with a stirring apparatus 32 for further processing.

Figure 5:
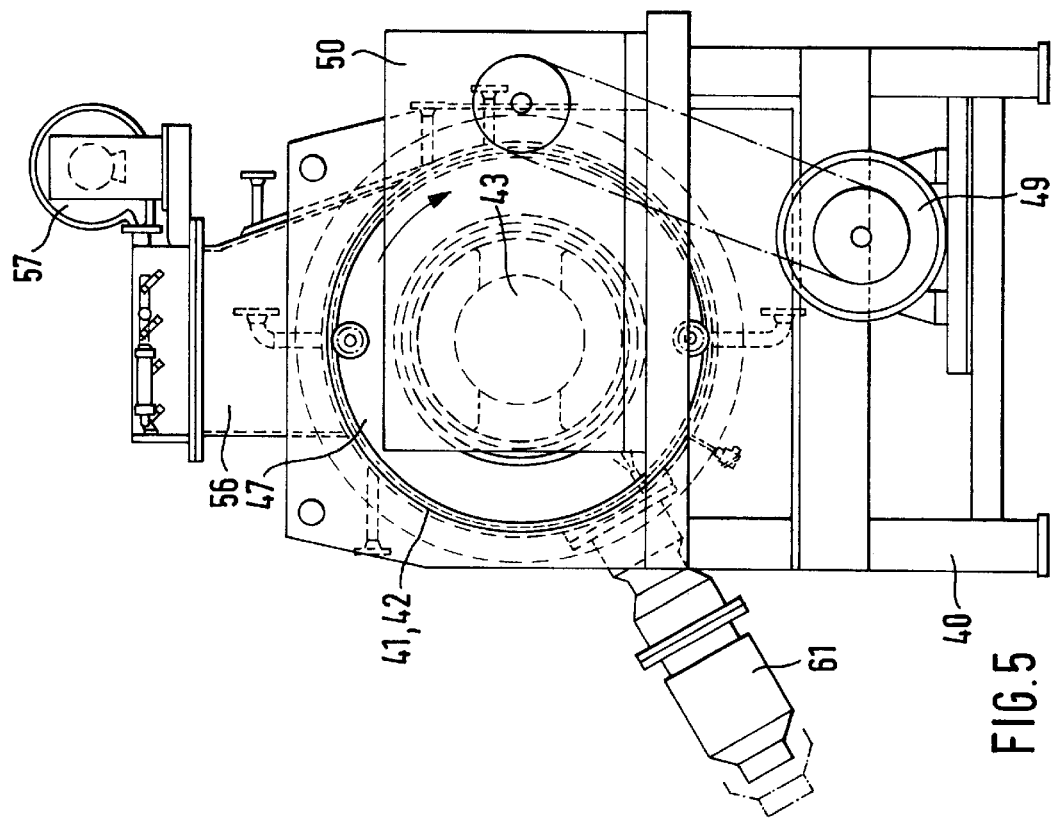
FIG. 5 is a left end view of the apparatus shown in FIG. 3.
Figure 4:
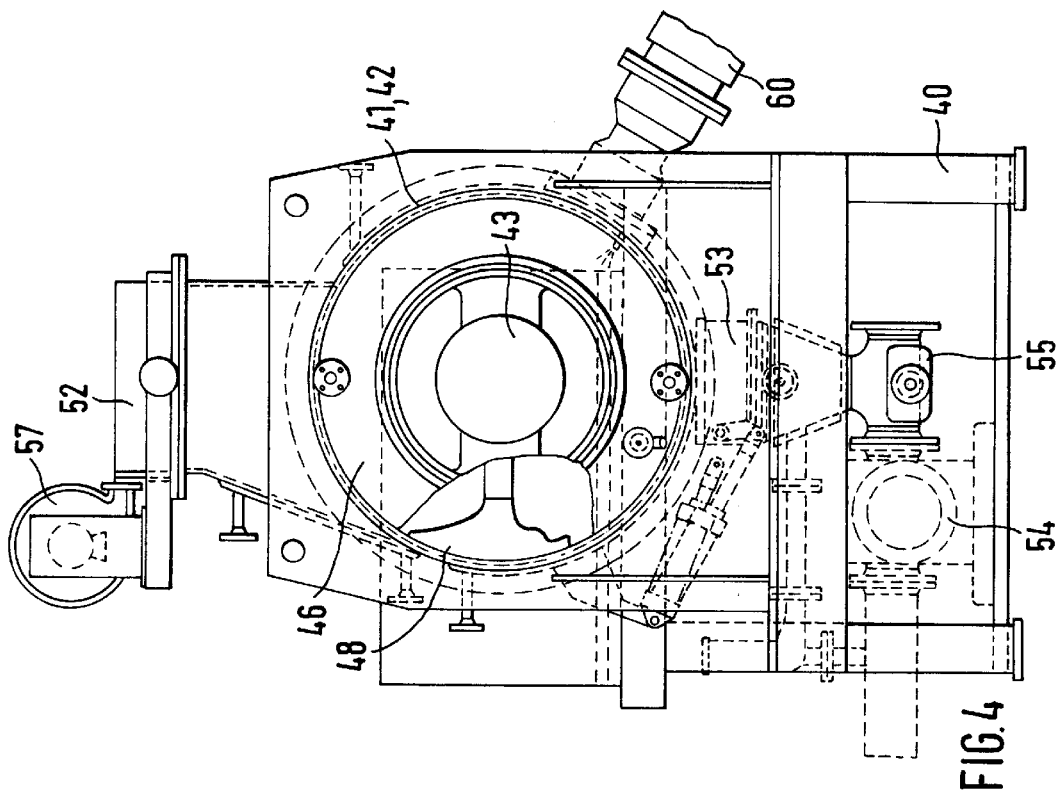
FIG. 4 is a right end view of the apparatus shown in FIG. 3.

FIGS. 3 to 5 depict a stirring device or a conche in side elevation view (FIG. 3), end elevation view of FIG. 3 from the right (FIG. 4), and end elevation view of FIG. 3 from the left (FIG. 5).

This inherently known stirring device has a frame 40 upon which a stirring drum 41 is mounted stationary, the drum having a double jacket 42 for carrying a heating medium or coolant therethrough.

A rotor shaft 43 is rotable coaxially in the stirring apparatus drum 41. The shaft 43 rests on supports 44, 45 and penetrates the end walls 46, 47 of the drum in a sealing manner. The shaft 43 carries mixing tools 48 distributed over its length with tools arranged at end radial positions by which the paste can be scraped from the casing of the drum 41 or brought to an unguent or paste-like consistency by shearing interaction with the casing, according to the direction of rotation of the shaft 43.

The drive of the rotor shaft 43 takes place through an electric motor 49 and a gear unit 50 through which the rotation speed of the rotor shaft 43 can be adjusted corresponding to the requirements of the tumbling process in the conche at the moment.

Reference numeral 51 designates the addition of paste through the nozzle 52 into the drum 41. When the tumbling process in the conche has ended, the liquefied paste is removed through a nozzle 53 with the aid of a pump 55 driven by a motor 54 and conveyed for further determination.

As is apparent, the drum 41 has a further nozzle 56 in addition to the nozzle 52. Moreover, a blower 57 sits in front of the nozzle 52 by which air 58 is conveyed into the interior of the drum 41, which leaves the drum interior again through the nozzle 56, as indicated by the arrow 59.

In the present process, this conventional ventilation of the stirring device serves to eliminate a residue of volatile components still remaining in the paste, to the extent that this is not desired for the finished chocolate.

As particularly apparent from FIGS. 4 and 5, so called rotor-stator mills 60, 61 also sit laterally on the drum 41. These protrude into the interior of the mixing drum 41 with their tools collision-free in relation to the mixing tools 48. These rotor-stator mills by their tools serve to carry the paste moved by the mixing tools 48 and thereby subject it to a pulverization of the paste particles, as well as bring about or support the dispersion or emulsion of the paste.

The device described on the basis of FIGS. 3 to 5 is, as said above, known per se, so that a further detailed description of it does not appear necessary. It should nonetheless be pointed out that a device of the type described on the basis of FIGS. 3 to 5 is basically also suited as a mixer 6, whereby, however, considerable simplifications can optionally be undertaken which result particularly from the smaller power input due to the lack of shearing work, and from the lighter mode of construction thereby possible. The use of rotor-stator mills can also, however, be useful here, and consequently be appropriate, since these mills can serve to pulverize the sugar crystals and consequently to create a larger surface for the cocoa paste or the powdered milk with the increased diffusion possibilities described above.

Overall, it should finally be pointed out in reference to the total process of the invention, including the apparatus described for its implementation, that basically suitable, at least substantially automatic operating means for control and mutual adjustment of the individual work sequences in regard to the respective operating temperatures, as well as the amounts of energy to be recorded and the required time sequences, etc. belong to this. These are, however, likewise known and will therefore not be represented and described in detail. Their orientation with the present process sequence of the invention results from its special configuration, and can be determined taking the known criteria into account without more since an alignment essentially takes place on henceforth considerably shorter processing times.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for manufacturing chocolate comprising mixing a charge of cocoa paste, sugar and optionally powdered milk in a premixer under application of heat, subsequently conveying the charge to a first grinder for pulverization, thereafter treating the charge by conching in at least one stirring device under temperature control while substantially removing volatile components in a form of water and organic acids by conducting a gas through the stirring device in a first operation adding and dispersing fat, emulsifiers and flavor additives and liquefying the resulting paste and subsequently pulverizing the paste wherein the addition and dispersion of fat, emulsifiers and flavor additives and the liquefaction of the paste are conducted in a second operation.

2. The process according to claim 1, wherein the first operation is implemented with the aid of at least one separate, temperature-controlled mixer (6), the subsequent pulverization takes place in a second grinder, and the operation is carried out with the aid of the stirring device (28, 29).

3. The process according to claim 1, wherein the gas is conducted through the mixer (6) in a closed circuit, during the first operation the gas is cooled in this circuit after discharge (8) from the mixer (6) for removal of the volatile components by condensation (11), the gas is thereafter reheated (15) before entering into the mixer (6) and enriched with water (18) for compensation for loss of water by the paste, and wherein at the end of the first operation water addition is interrupted and water content of the paste is reduced to a level required for a finished chocolate product.

4. The process according to claim 1, wherein fat is added to the paste at the end of the first operation.

5. The process according to claim 1, wherein final liquefaction of the paste is conducted in a third operation after the second operation by means of a mixer (31) with high shearing effect.

* * * * *